US010724905B2

(12) United States Patent
Farley et al.

(10) Patent No.: US 10,724,905 B2
(45) Date of Patent: Jul. 28, 2020

(54) DEVICE HAVING TANK SHAPED TO PRODUCE FLOW DIRECTION AND IMPROVE TEMPERATURE STABILITY AND UNIFORMITY

(71) Applicant: Fluke Corporation, Everett, WA (US)

(72) Inventors: David W. Farley, Orem, UT (US); Michael W. Hirst, Lindon, UT (US)

(73) Assignee: Fluke Corporation, Everett, WA (US)

( * ) Notice: Subject to any disclaimer, the term of this patent is extended or adjusted under 35 U.S.C. 154(b) by 571 days.

(21) Appl. No.: 15/465,105

(22) Filed: Mar. 21, 2017

(65) Prior Publication Data

US 2018/0274992 A1    Sep. 27, 2018

(51) Int. Cl.
   *G01K 15/00*    (2006.01)
(52) U.S. Cl.
   CPC ......... *G01K 15/002* (2013.01); *G01K 15/005* (2013.01)
(58) Field of Classification Search
   CPC combination set(s) only.
   See application file for complete search history.

(56) References Cited

U.S. PATENT DOCUMENTS

| 4,379,775 A | 4/1983 | Brandstetr et al. |
| 5,137,445 A * | 8/1992 | Chu .................. B60H 1/00414 126/110 B |
| 2005/0239199 A1* | 10/2005 | Kunas ..................... B01F 7/001 435/297.1 |
| 2006/0064257 A1 | 3/2006 | Pennington et al. |
| 2006/0244407 A1 | 11/2006 | Lawrence et al. |
| 2007/0156289 A1 | 7/2007 | Altieri et al. |
| 2009/0064603 A1* | 3/2009 | James ..................... G01K 15/00 52/169.5 |
| 2011/0207590 A1* | 8/2011 | Ooyama ................... B04B 9/10 494/9 |

(Continued)

FOREIGN PATENT DOCUMENTS

| CN | 203274963 U | 11/2013 |
| CN | 105651421 A | 6/2016 |

(Continued)

OTHER PUBLICATIONS

U.S. Appl. No. 15/465,055, filed Mar. 21, 2017, Rapid Cooling Device and Method for a Calibration Bath.

(Continued)

*Primary Examiner* — Lisa M Caputo
*Assistant Examiner* — Nasir U. Ahmed
(74) *Attorney, Agent, or Firm* — Seed Intellectual Property Law Group LLC (57) ABSTRACT

A device includes a tank, a motor, and a fluid propulsion device, for example, a propeller that is coupled to the motor. The tank includes a bottom wall and side walls. A first surface of a first side wall forms an obtuse angle with a surface of the bottom wall. The fluid propulsion device is disposed inside the tank opposite the first surface of the first side wall. A first surface of a second side wall forms an obtuse angle with the surface of the bottom wall. Rounded corners may be disposed within the tank where pairs of adjacent side walls meet the bottom wall. Rounded surfaces may be formed where the side walls meet the bottom wall. The structure of the tank enables the propeller to rapidly disperse a fluid throughout the tank.

12 Claims, 5 Drawing Sheets

(56) References Cited

U.S. PATENT DOCUMENTS

| | | |
|---|---|---|
| 2013/0148687 A1 | 6/2013 | Sjogren et al. |
| 2013/0149710 A1 | 6/2013 | Yoon et al. |
| 2014/0267805 A1 | 9/2014 | Webb |

FOREIGN PATENT DOCUMENTS

| | | |
|---|---|---|
| EP | 1 837 640 A2 | 9/2007 |
| JP | 60-172592 U | 11/1985 |
| JP | 8-247861 A | 9/1996 |

OTHER PUBLICATIONS

U.S. Appl. No. 15/465,113, filed Mar. 21, 2017, Calibration Bath With Stir Motor Closed-Loop Control and Stirring Viscosity Detection and Adjustment.

Extended European Search Report, dated Jul. 20, 2018, for European Application No. 18163197.9-1001, 15 pages.

Extended European Search Report, dated Jul. 20, 2018, for European Application No. 18162926.2-1009, 9 pages.

Extended European Search Report, dated Aug. 14, 2018, for European Application No. 18163198.7, 10 pages.

Fluke Corporation, Hart Scientific Division, "Field Metrology Wells," Technical Data, Mar. 11, 2010, 6 pages.

Fluke Corporation, Hart Scientific Division, "7013 Calibration Bath User's Guide," Rev. 682804, 2005, 83 pages.

\* cited by examiner

DEVICE HAVING TANK SHAPED TO PRODUCE FLOW DIRECTION AND IMPROVE TEMPERATURE STABILITY AND UNIFORMITY

BACKGROUND

Technical Field

The present disclosure relates to temperature regulation, and more particularly to regulation of the temperature of fluids used in calibration bath devices.

Description of the Related Art

Calibration baths use a volume of fluid to provide a constant temperature environment for calibrating thermal devices, such as temperature sensors and digital thermometers, for example. Because the temperature of the fluid is critical to accurately calibrating such devices, insulating materials and other means are used to reduce the impact of ambient conditions on the temperature of the fluid.

In calibration baths, heaters can be used to increase the temperature of a working volume of fluid to a desired temperature at which calibration of thermal devices is to be performed. These baths are not usually equipped with a cooling system to decrease the temperature of the working volume of fluid. Instead, when an operator wishes to decrease the temperature of the working volume of fluid, the operator simply switches off the heat source and allows ambient conditions to remove heat from the working volume of fluid, which can take a considerable amount of time. For example, if a working volume of fluid in a calibration bath is heated to a temperature that is several degrees higher than a desired temperature at which calibration of thermal devices is to be performed, it can take several minutes for ambient conditions to cool the fluid to the desired temperature, depending on the actual ambient conditions. By way of another example, it can take several hours to cool a working volume of fluid from 250° C. to 35° C. using a conventional calibration bath.

Calibration baths can be portable and moved to perform calibration of thermal devices at a variety of locations. It may be desirable to quickly cool a fluid in a portable calibration bath before moving the calibration bath, so that it can be moved safely without the risk of hot fluid spilling and causing severe burns to an operator, for example.

High-temperature calibration baths often use silicone oils as fluid media. Silicone oils degrade rapidly at temperatures above their oxidation temperature. Silicone oils are expensive. Accordingly, it may be desirable to quickly cool such oils to a temperature that is below their oxidation temperature after calibration of thermal devices is performed, to extend the useful life of the oils.

Vapor compression refrigeration systems and external cooling from chillers can be used to speed up cooling of working volumes of fluids in high-temperature calibration baths; however, vapor compression refrigeration systems limit the high end of a calibration bath's temperature range due to limits of a refrigerant's temperature range, and limits of a lubricating oil that travels throughout the plumbing of such systems. For example, the high end of a calibration bath's temperature range that uses a vapor compression refrigeration system may be limited to 170° C. In addition, compressors and refrigerants used in such systems can be damaged when return gas temperatures are sufficiently high to damage exhaust valves therein, for example. Chillers that externally cool working volumes of fluids in calibration baths have the same problems.

Thermo-electric modules (TEMs) also can be used to speed up cooling of working volumes of fluids in calibration baths. However, TEMs may be damaged when subjected to high temperatures and thus limit the high end of a calibration bath's temperature range.

In addition, coils through which compressed air or a liquid is circulated have been used as accessories to speed up cooling of working volumes of fluids in high-temperature calibration baths. Such coils can be expensive and dangerous. For example, if tap water is circulated through such a coil, dangerously high pressures can result if the temperature of a working volume of fluid is sufficiently high to cause the water to boil.

BRIEF SUMMARY

A device may be summarized as including a tank having a bottom wall and a plurality of side walls, the side walls including a first side wall having a first surface that forms a first obtuse angle with a surface of the bottom wall, and a second side wall having a first surface that forms a second obtuse angle with the surface of the bottom wall; a motor; and a fluid propulsion device coupled to the motor, the fluid propulsion device being disposed inside the tank opposite the first surface of the first side wall. The first side wall may be opposite the second side wall. The first surface of the first side wall may be longer than the first surface of the second side wall. The first side wall may include a second surface that extends from the first surface of the first side wall and forms a third obtuse angle with the first surface of the first side wall. The second side wall may include a second surface that extends from the first surface of the second side wall and forms a fourth obtuse angle with the first surface of the second side wall. The second surface of the second side wall may be longer than the second surface of the first side wall. The side walls may include the first side wall, the second side wall, a third side wall, and a fourth side wall; a first rounded corner may be disposed within the tank where the first side wall, the third side wall, and the bottom wall meet; a second rounded corner may be disposed within the tank where the first side wall, the fourth side wall, and the bottom wall meet; a third rounded corner may be disposed within the tank where the second side wall, the third side wall, and the bottom wall meet; and a fourth rounded corner may be disposed within the tank where the second side wall, the fourth side wall, and the bottom wall meet. A first rounded surface may be disposed within the tank where the first side wall and the bottom wall meet; a second rounded surface may be disposed within the tank where the second side wall and the bottom wall meet; a third rounded surface may be disposed within the tank where the third side wall and the bottom wall meet; and a fourth rounded surface may be disposed within the tank where the fourth side wall and the bottom wall meet. Each of the first surface of the first side wall, the first surface of the second side wall, and the surface of the bottom wall may be flat.

The device may further include a heater circuit which, in operation, generates heat within the tank.

The device may further include one or more temperature sensors; and a controller coupled to the motor and the one or more temperature sensors, the controller, in operation, causing the motor to rotate at a plurality of speeds based on input from the one or more temperature sensors.

A device may be summarized as including a tank having a bottom wall and a plurality of side walls, the side walls including a first side wall, a second side wall, a third side wall, and a fourth side wall; a motor; and a fluid propulsion device disposed inside the tank and coupled to the motor, wherein a first rounded corner is disposed within the tank where the first side wall, the third side wall, and the bottom wall meet, wherein a second rounded corner is disposed within the tank where the first side wall, the fourth side wall, and the bottom wall meet, wherein a third rounded corner is disposed within the tank where the second side wall, the third side wall, and the bottom wall meet, wherein a fourth rounded corner is disposed within the tank where the second side wall, the fourth side wall, and the bottom wall meet, wherein a first rounded surface is disposed within the tank where the first side wall and the bottom wall meet, wherein a second rounded surface is disposed within the tank where the second side wall and the bottom wall meet, wherein a third rounded surface is disposed within the tank where the third side wall and the bottom wall meet, and wherein a fourth rounded surface is disposed within the tank where the fourth side wall and the bottom wall meet. The first side wall may be opposite the second side wall. The first surface of the first side wall may be longer than the first surface of the second side wall. A first surface of the first side wall may form a first obtuse angle with a surface of the bottom wall, and a second surface of the first side wall that extends from the first surface of the first side wall may form a second obtuse angle with the first surface of the first side wall. A first surface of the second side wall may form a third obtuse angle with the surface of the bottom wall, and a second surface of the second side wall that extends from the first surface of the second side wall may form a fourth obtuse angle with the first surface of the second side wall. The second surface of the second side wall may be longer than the second surface of the first side wall. Each of the first surface of the first side wall, the first surface of the second side wall, and the surface of the bottom wall may be flat.

The device may further include a heater circuit which, in operation, generates heat within the tank.

The device may further include one or more temperature sensors; and a controller coupled to the motor and the one or more temperature sensors, the controller, in operation, causing the motor to rotate at a plurality of speeds based on input from the one or more temperature sensors.

DETAILED DESCRIPTION

Figure 1:
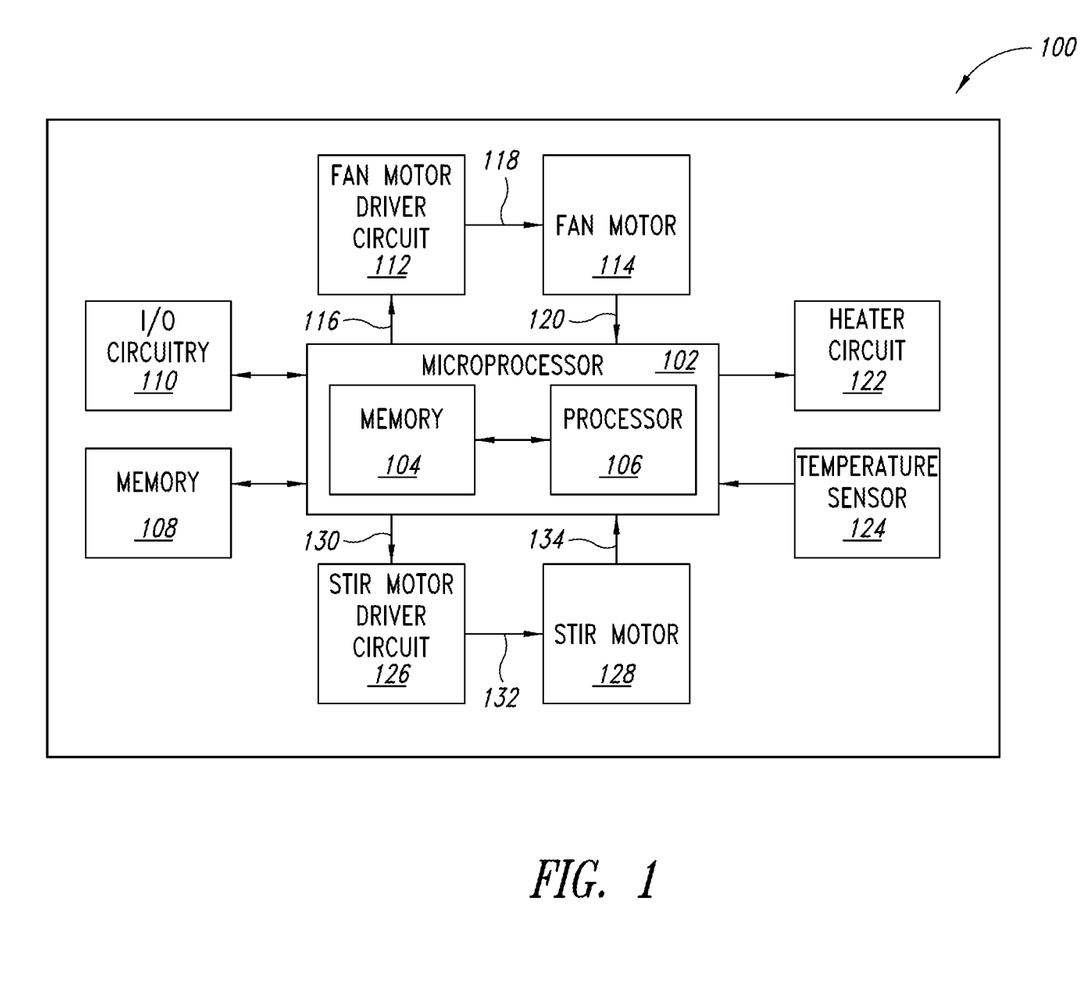
FIG. 1 is a block diagram of a calibration device, according to one or more embodiments of the present disclosure.

FIG. 1 is a block diagram of a calibration device 100, according to one or more embodiments of the present disclosure. The calibration device 100 includes a microprocessor 102 having a memory 104 and a processor 106. The calibration device 100 also includes a memory 108 that is coupled to the microprocessor 102. In one or more embodiments, the memory 104 is comprised of one or more conventional Random Access Memory (RAM) modules. In one or more embodiments, the memory 108 is comprised of one or more conventional Electronically Erasable Programmable Read Only Memory (EEPROM) modules. As will be explained in detail below, the memory 108 stores instructions that, when executed by the processor 106, cause the calibration device 100 to perform the functions described below. In one or more embodiments, the processor 106 uses the memory 104 as a working memory as the processor 106 executes the instructions that are stored by the memory 108.

The calibration device 100 also includes input/output (I/O) circuitry 110. In one or more embodiments, the I/O circuitry 110 includes input devices such as a touch input device, buttons, knobs, and/or dials, for example, that an operator can use to control operation of the calibration device 100. Additionally, in one or more embodiments, the I/O circuitry 110 includes one or more output devices such as a display device (e.g., liquid crystal display), light emitting devices, speakers, a buzzer, and/or data interfaces (e.g., Universal Serial Bus (USB) interfaces), for example.

The calibration device 100 also includes a fan motor driver circuit 112 that is electrically coupled to a fan motor 114 and the microprocessor 102. The microprocessor 102 controls a speed at which the fan motor 114 rotates by providing a control signal 116 to the fan motor driver circuit 112, which provides a corresponding control signal 118 to the fan motor 114. In one or more embodiments, the control signals 116 and 118 are pulse width modulated power signals that cause the fan motor 114 to operate at a variety of speeds, depending on a duty cycle of the control signal 116 and a duty cycle of the control signal 118. The duty cycle of each of the control signals 116 and 118 is a ratio of "on" time to "off" time within a predetermined period of time corresponding to one cycle. In one or more embodiments, the microprocessor 102 generates the control signal 116 based on an amount of cooling required, in accordance with a program stored by the memory 108. In one or more embodiments, the fan motor driver circuit 112 generates the control signal 118 by amplifying the control signal 116 to provide higher current and voltage that is required by the fan motor 114. In one or more embodiments, the control signals 116 and 118 have the same duty cycle. In one or more embodiments, the fan motor 114 provides to the microprocessor 102 a signal 120 indicating the actual speed at which the fan motor 114 is rotating.

The calibration device 100 also includes a heater circuit 122 and one or more temperature sensors 124. In one or more embodiments, the heater circuit 122 includes one or more heating elements attached to outer surfaces of sides walls 156 of a tank 160. In one or more embodiments, the heater circuit 122 includes a coil immersion heater. For example, the heater circuit 122 includes one or more resistive heating elements that produce heat in response to a current flowing therethrough. The heat from the heating elements is transferred to a first fluid that is circulated within a coil. The coil is disposed within the tank 160 near a propeller 172, for example, above the propeller 172 (see FIG. 3). The propeller 172 circulates a second fluid that has been heated by the coil to maintain the second fluid at a constant temperature that is uniformly distributed throughout the tank 160.

The microprocessor 102 provides a control signal to the heater circuit 122 based on a signal received from the one or more temperature sensors 124. For example, if the memory 104 of the microprocessor 102 stores information indicating that a desired temperature is 250° C. and the microprocessor 102 receives from a temperature sensor 124 a signal indicating that a temperature sensed by the temperature sensor 124 is 225° C., the microprocessor 102 provides a control signal to the heater circuit 122 that causes the heater circuit 122 to produce a relatively high amount of heat. Subsequently, if the microprocessor 102 receives from a temperature sensor 124 a signal indicating that a temperature sensed by the temperature sensor 124 is 255° F., the microprocessor 102 provides a control signal to the heater circuit 122 that causes the heater circuit 122 to produce less heat, or no heat.

In one or more embodiments, the microprocessor 102 controls the fan motor 114 based on a state of the heater circuit 122 and/or a sensed temperature of the fluid in the tank 160. For example, while the microprocessor 102 controls the heater circuit 122 to be in a state in which it generates a relatively high amount of heat, the microprocessor 102 controls the fan motor 114 to be in an off state. Once a fluid within the tank 160 is heated to a desired temperature by the heater circuit 122, the microprocessor 102 controls the heater circuit 122 to be in a state in which it generates less heat. If a current temperature of the fluid within the tank 160 is greater than a desired temperature by a first predetermined amount, the microprocessor 102 controls the fan motor 114 to rotate at a relatively high rate. As the temperature of the fluid within the tank 160 gets closer to the desired temperature, the microprocessor 102 controls the fan motor 114 to rotate at a lower rate. When the current temperature of the fluid within the tank 160 is greater than the desired temperature by a second predetermined amount, which is smaller than the first predetermined amount, the microprocessor 102 controls the fan motor 114 to be in an off state.

In one or more embodiments, the memory 108 stores a table or other suitable data structure in which a plurality of values of the difference between the current temperature and the desired temperature of the fluid within the tank 160 is associated with a plurality of corresponding values of the speed of the fan motor 114. Alternatively, the memory 108 may store a formula-driven algorithm that dynamically calculates a desired speed of the fan motor 114 based on a determined difference between the current temperature and the desired temperature of the fluid within the tank 160. It is noted that the speed at which the fan motor 114 rotates, in this embodiment, is proportional to the power level of the control signal supplied thereto. For example, while a signal having a power level corresponding to a maximum power level that can be supplied to the fan motor 114 (e.g., a signal having duty cycle of 100%), the fan motor 114 may rotate at 3000 revolutions per minute. Similarly, while a signal having a power level corresponding to half of the maximum power level (e.g., a signal having duty cycle of 50%) that can be supplied to the fan motor 114, the fan motor 114 may rotate at 1500 revolutions per minute. In one or more embodiments, the memory 108 stores instructions that cause the microprocessor 102 convert a value of the speed of the fan motor 114 obtained from such a table or data structure or algorithm into a corresponding power level value. In one or more embodiments, the memory 108 stores a table or other suitable data structure in which a plurality of values of the difference between the current temperature and the desired temperature of the fluid within the tank 160 is associated with a plurality of power level values for the control signal provided to the fan motor 114. Alternatively, the memory 108 may store an algorithm that dynamically calculates a power level value for driving the fan motor 114 based on a determined difference between the current temperature and the desired temperature of the fluid within the tank 160.

The calibration device 100 also includes a stir motor driver circuit 126 that is electrically coupled to a stir motor 128 and the microprocessor 102. In one or more embodiments, the stir motor driver circuit 126 manages power control and commutation for the stir motor 128. In one or more embodiments, commutation is synchronized with the angular position of the stir motor 128 as it rotates by utilizing feedback to the stir motor driver circuit 126 provided from Hall-effect sensors included in the stir motor 128. In one or more embodiments, the stir motor 128 is a brushless direct current (DC) motor.

The speed of the stir motor 128 is determined by the voltage supplied to the stir motor 128. The microprocessor 102 controls the speed at which the stir motor 128 rotates by providing a control signal 130 to the stir motor driver circuit 126, which provides a corresponding control signal 132 to the stir motor 128. In one or more embodiments, the control signals 130 and 132 are pulse width modulated power signals that cause the stir motor 128 to operate at a variety of speeds, depending on a duty cycle of the control signal 130 and a duty cycle of the control signal 132. The duty cycle of each of the control signals 130 and 132 is a ratio of "on" time to a predetermined period of time corresponding to one cycle. In one or more embodiments, the microprocessor 102 generates the control signal 130 in accordance with a program stored by the memory 108. In one or more embodiments, the stir motor driver circuit 126 generates the control signal 132 by amplifying the control signal 130. In one or more embodiments, the control signals 130 and 132 have the same duty cycle. In one or more embodiments, the stir motor 128 provides to the microprocessor 102 a signal 134 indicating the actual speed at which the stir motor 128 is rotating.

In one or more embodiments, the calibration device 100 includes a vibration sensor 136, for example, an accelerometer. The vibration sensor 136 produces a signal that indicates a level of vibration sensed by the vibration sensor 136, which is provided to the microprocessor 102. After receiving the signal, the microprocessor 102 compares the level of vibration sensed by the vibration sensor 136 to a predetermined threshold value. If the level of vibration sensed by the vibration sensor 136 is greater than or equal to the threshold value, the microprocessor 102 can cause a light emitting diode (LED) included in the I/O circuitry 110 to emit light, cause a speaker included in the I/O circuitry 110 to emit sound, cause the speed at which the fan motor 114 rotates to decrease, and/or cause the speed at which the stir motor 128 rotates to decrease, for example.

Figure 2:
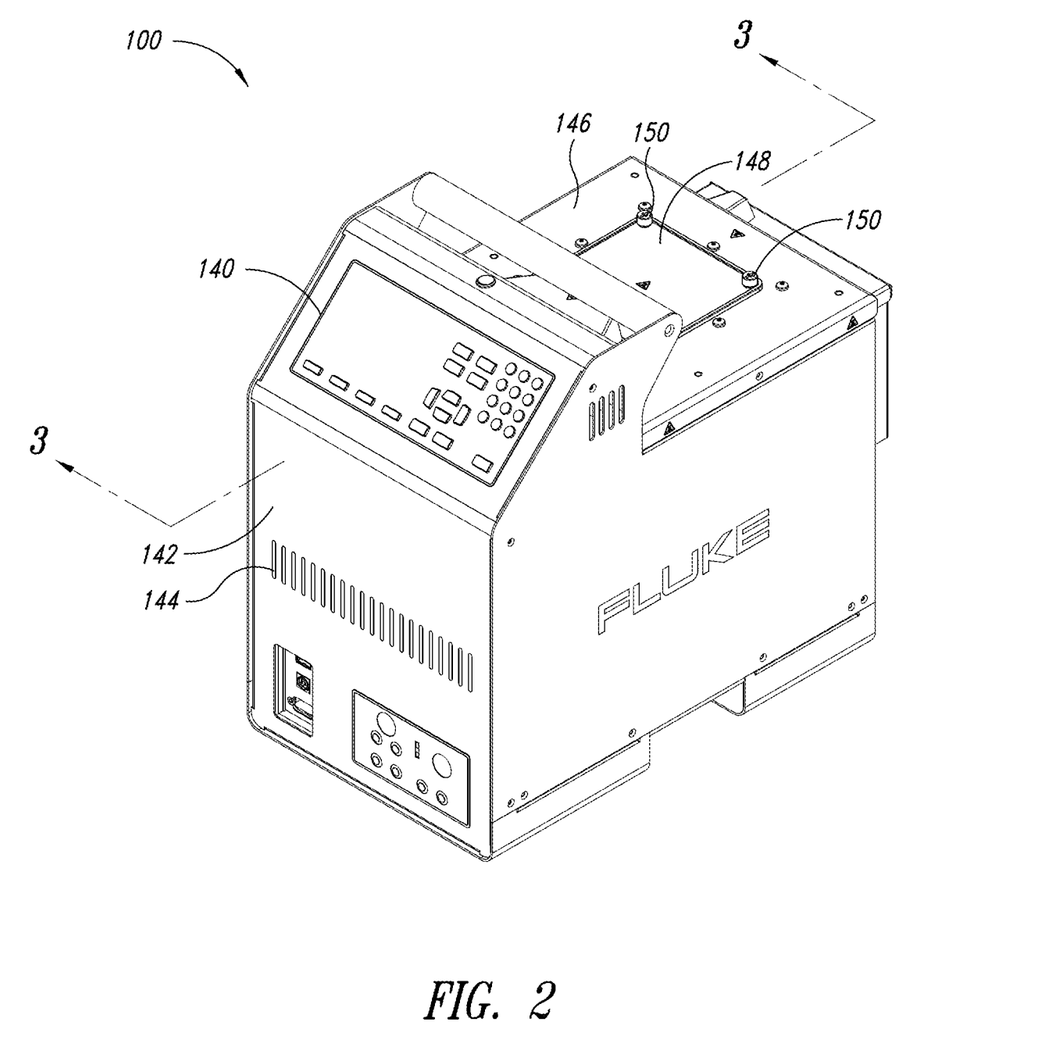
FIG. 2 is an isometric view of a calibration device, according to one or more embodiments of the present disclosure.

FIG. 2 is an isometric view of the calibration device 100, according to one or more embodiments of the present disclosure. The calibration device 100 includes a control panel 140, which includes one or more of the components of the I/O circuitry 110 discussed above. For example, the control panel 140 includes a plurality of buttons that an operator uses to input parameters, which the microprocessor 102 uses to control operation of the calibration device 100.

The calibration device 100 includes a case that has a front panel 142 with a plurality of apertures 144 formed therein. As will be explained below, ambient air enters the calibration device 100 through the apertures 144 formed in the front panel 142 and cools a fluid disposed within the tank 160 that is used during calibration of thermal devices. The tank 160 includes a flange 146 to which a tank cover 148 can be attached using a plurality of bolts 150, for example.

Figure 3:
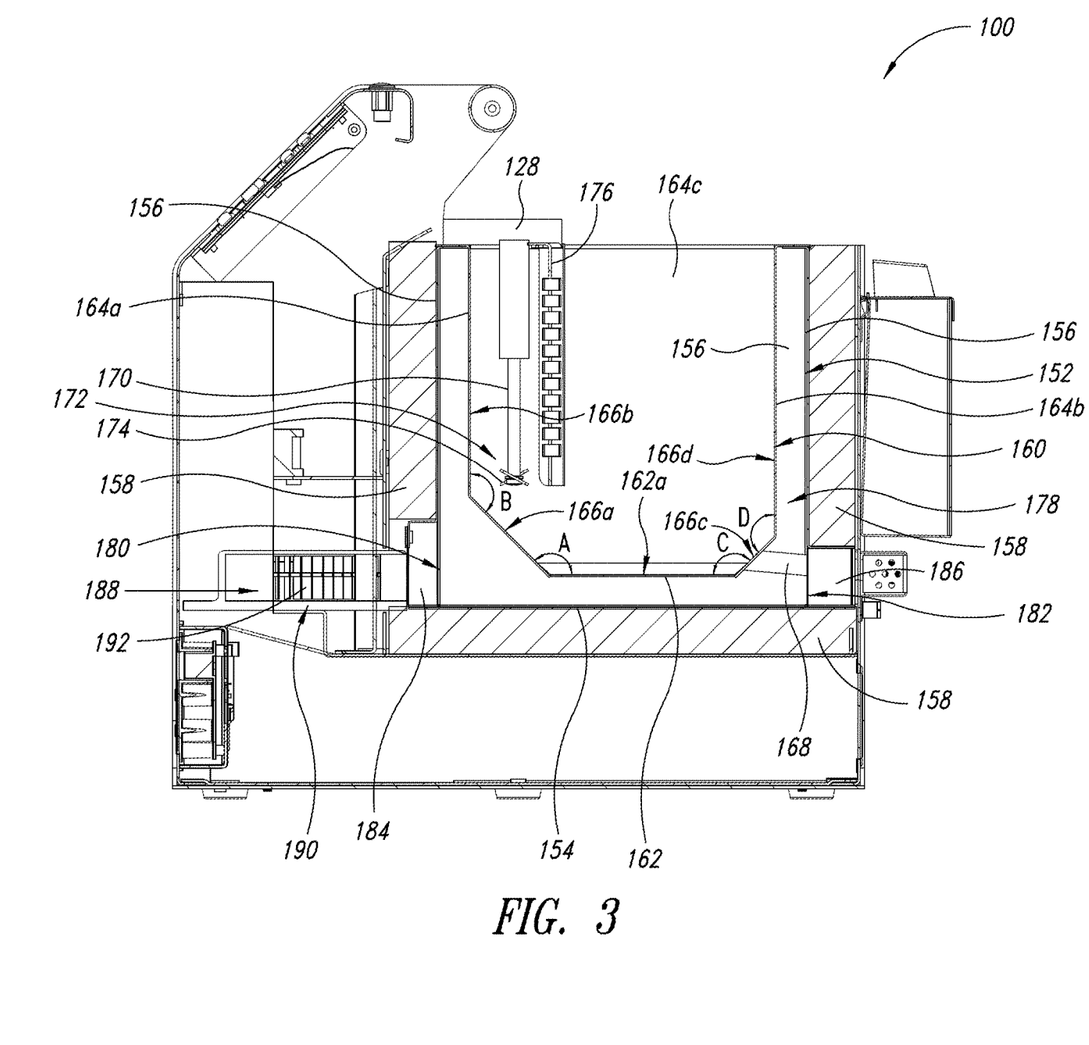
FIG. 3 is a sectional view of a calibration device, according to one or more embodiments of the present disclosure.

FIG. 3 is a sectional view of the calibration device 100 taken along the line 3-3 shown in FIG. 2, according to one or more embodiments of the present disclosure. Components of the calibration device 100 that are not necessary to explain aspects of the calibration device 100 discussed below are not shown in FIG. 3 to simplify the discussion that follows.

A chamber 152 is disposed within the calibration device 100. The chamber 152 includes a bottom wall 154 and a plurality of side walls 156 that extend from the bottom wall 154. An interior surface of the bottom wall 154 and each of the side walls 156 reflect thermal energy (e.g., infrared energy) from the tank 160 that is incident thereon. The tank 160 is disposed within the chamber 152. In one or more embodiments, interior surfaces of the bottom wall 154 and each of the side walls 156 are formed from stainless steel, which reflects a majority of thermal energy that is emitted from the tank 160 back toward the tank 160.

An insulating material 158 is disposed outside of the chamber 152 surrounding an exterior surface of the bottom wall 154 and each of the side walls 156. The insulating material 158 reduces the amount of thermal energy (e.g., heat) that is transferred between the chamber 152 and an ambient environment in which the calibration device 100 is located. In one or more embodiments, the insulating material 158 comprises a ceramic fiber blanket.

The tank 160 includes a bottom wall 162 and four side walls 164a, 164b, 164c, and 164d, which extend from the bottom wall 162. As described in detail below, one or more of the side walls 164a-164d include one or more sloped surfaces that are arranged to efficiently disperse a fluid, which was recently heated by the heater circuit 122 and propelled by the propeller 172, so that the recently heated fluid rapidly mixes in the tank 160 and the fluid is maintained at a constant temperature throughout the tank 160.

In one or more embodiments, a first side wall 164a includes a first surface 166a that extends from a surface 162a of the bottom wall 162, and a second surface 166b that extends from the first surface 166a. A second side wall 164b includes a first surface 166c that extends from the surface 162a of the bottom wall 162, and a second surface 166d that extends from the first surface 166c. The first side wall 164a is opposite the second side wall 164b.

In one or more embodiments, the first surface 166a of the first side wall 164a is longer than the first surface 166c of the second side wall 164b, and the second surface 166d of the second side wall 164b is longer than the second surface 166b of the first side wall 164a. For example, a distance measured along the first surface 166a from the top of the first surface 166a to the bottom of the first surface 166a is greater than a distance measured along the first surface 166c from the top of the first surface 166c to the bottom of the first surface 166c, and a distance measured along the second surface 166d from the top of the second surface 166d to the bottom of the second surface 166d is greater than a distance measured along the second surface 166b from the top of the second surface 166b to the bottom of the second surface 166b.

In one or more embodiments, the first surface 166a of the first side wall 164a and the surface 162a of the bottom wall 162 form an obtuse angle A within the tank 160; the first surface 166a and the second surface 166b of the first side wall 164a form an obtuse angle B within the tank 160; the first surface 166c of the second side wall 164b and the surface 162a of the bottom wall 162 form an obtuse angle C within the tank 160; and the first surface 166c and the second surface 166d of the second side wall 164b form an obtuse angle D within the tank 160. In one or more embodiments, the angle A is 135°, the angle B is 135°, the angle C is 130°, and the angle D is 140°. The angles A, B, C, and D can have other values without departing from the scope of the present disclosure.

While the heater circuit 122 is heating a fluid disposed in the tank 160, some of the fluid that was recently heated by the heater circuit 122 is moved downwardly by the propeller 172 toward the first surface 166a of the first side wall 164a. Some of the recently heated fluid deflects off of the first surface 166a of the first side wall 164a and moves upwardly across the tank 160 away from the first surface 166a of the first side wall 164a. Some of the recently heated fluid travels across a lower portion of the tank 160 and deflects off of the first surface 166c of the second side wall 164b, which causes the fluid to move upwardly across the tank 160 away from the first surface 166c of the second side wall 164b. The arrangement of the first surface 166a of the first side wall 164a and the first surface 166c of the second side wall 164b with respect to each other, and with respect to the surface 162a of the bottom wall 162 and the propeller 172, causes the recently heated fluid to rapidly disperse within the tank 160.

In one or more embodiments, the tank 160 includes rounded features that enable the propeller 172 to efficiently circulate a fluid within the tank 160. Such rounded features prevent the fluid within the tank 160 from being trapped or impeded as the propeller 172 moves the fluid toward the first surface 166a of the first side wall 164a and the first surface 166c of the second side wall 164b, which causes the fluid to move upwardly and disperse throughout the tank 160, as described above. Examples of such rounded features are discussed in greater detail below with reference to FIG. 5.

In one or more embodiments, the bottom wall 162 and side walls 164a-164d are formed from stainless steel. In one or more embodiments, the bottom wall 162 and side walls 164a-164d are integrally formed. In one or more embodiments, the bottom wall 162 and side walls 164a-164d are welded together. In one or more embodiments, a drainage conduit 168 is fluidly coupled to the first surface 166c of the second side wall 164b, which enables a fluid to be drained from the tank 160. In one or more embodiments, each of the surfaces 164a-164d and the surface 162a is flat.

A fluid (e.g., silicone oil) can be placed in the tank 160 via an opening that is accessible while the tank cover 148 is removed. The fluid is then heated to and maintained at a desired temperature. Subsequently, one or more thermal devices are placed in the fluid that is disposed in the tank 160 via the opening, and calibration of the thermal devices is performed. The stir motor 128 is operated to help ensure that the temperature of a fluid disposed in the tank 160 is maintained at a constant temperature that is uniformly distributed throughout the tank 160 while calibration of the thermal devices is performed.

The stir motor 128 is coupled to a fluid propulsion device that causes a fluid within the tank 160 to be circulated. In one or more embodiments, the fluid propulsion device is the propeller 172. A shaft 170 couples the propeller 172 to a rotor (not shown) of the stir motor 128. Accordingly, the propeller 172 rotates while the rotor of the stir motor 128 rotates. The propeller 172 includes a plurality of blades 174 that are angled to move the fluid toward the first surface 166a of the first side wall 164a while the propeller 172 rotates in a predetermined direction (e.g., clockwise). A guard 176 having a plurality of apertures formed therein is disposed within the tank 160 adjacent to the propeller 172. The guard 176 prevents a thermal device from coming into contact with the propeller 172 while the device is being calibrated within the tank 160.

In one or more embodiments, the fluid propulsion device is an impeller that is disposed within a pump. The impeller is coupled to the stir motor 128. Rotation of the stir motor 128 causes the impeller to rotate thereby creating a pressure differential within the pump, which causes a fluid within the tank 160 to be drawn into an inlet of the pump and then forced out of an outlet of the pump. The pump is arranged so that fluid exiting the outlet is heated by the heater circuit 122. Additionally, fluid exiting the outlet of the pump is directed toward the first surface 166a of the first side wall 164a, in a manner that is similar to embodiments in which the propeller 172 directs the fluid toward the first surface 166a of the first side wall 164a.

In one or more embodiments, the fluid propulsion device is a piston, plunger, or diaphragm that is disposed within a pump. The piston, plunger, or diaphragm is coupled to the stir motor 128. Rotation of the stir motor 128 causes the piston, plunger, or diaphragm to reciprocate (e.g., move in a first direction and then in a second direction, wherein the first direction is opposite the second direction) within a chamber thereby creating a pressure differential within the pump, which causes a fluid within the tank 160 to be drawn into an inlet of the pump and then forced out of an outlet of the pump. The pump is arranged so that fluid exiting the outlet is heated by the heater circuit 122. Additionally, fluid exiting the outlet of the pump is directed toward the first surface 166a of the first side wall 164a, in a manner that is similar to embodiments in which the propeller 172 directs the fluid toward the first surface 166a of the first side wall 164a.

It may be desirable to lower the temperature of the fluid disposed in the tank 160 before, during, and after calibration testing. For example, while the stir motor 128 is operated, friction between the propeller 172 and the fluid may cause the temperature of the fluid within to rise above a desired temperature at which a thermal device is to be calibrated. The calibration device 100 is arranged so that the fluid within the tank 160 can be cooled quickly, if necessary, and maintained at a constant temperature.

More particularly, the tank 160 is spaced apart from the chamber 152. A conduit 178 is formed between the tank 160 and the chamber 152. The conduit 178 extends between the bottom wall 154 of the chamber 152 and the bottom wall 162 of the tank 160, and between the side walls 156 of the chamber 152 and respective side walls 164a-164c of the tank 160. The conduit 178 includes an inlet 180 and an outlet 182, which are disposed in a lower portion of the chamber 152 to help prevent natural convection of air within the conduit 178. A valve 184 is disposed adjacent to the inlet 180. In one or more embodiments, a valve 186 is disposed adjacent to the outlet 182. In one or more embodiments, the valve 184 and the valve 186 are check valves that enable air to pass therethrough in only one direction. More particularly, the valve 184 enables air to pass only into the inlet 180 of the conduit 178, and the valve 186 enables air to pass only out of the outlet 182 of the conduit 178. Some embodiments may have only one valve, e.g., the valve 184 disposed adjacent to the inlet 180. In one or more embodiments, the conduit 178 exposes the entire external surface of the tank 160 to air that flows through the conduit 178.

A fan 188 is disposed within the calibration device 100 adjacent to the chamber 152. The fan 188 includes the fan motor 114 and a propeller 190 having a plurality of blades 192. A rotor (not shown) of the fan motor 114 is coupled to the propeller 190. Accordingly, the propeller 190 rotates while the fan motor 114 rotates. The blades 192 are angled such that, while the propeller 190 rotates in a predetermined direction (e.g., clockwise), the propeller 190 draws ambient air through apertures 144 formed in the front panel 142 and directs the ambient air through the valve 184 into the inlet 180 of the conduit 178. The fan 188 provides a relatively high-pressure air flow into the conduit 178. In one or more embodiments, the ambient air travels through the conduit 178 around the tank 160, exits through the outlet 182, passes through the valve 186, and continues out of the calibration device 100 through apertures formed in a back panel of the case of the calibration device 100.

As the ambient air passes over the bottom wall 162 and the side walls 164a-164d of the tank 160, the ambient air is heated by the high temperature fluid in the tank 160. Subsequently, the propeller 190 forces the heated air out of the calibration device 100. Accordingly, while the fan motor 114 rotates, a fluid disposed in the tank 160 is cooled by the flow of ambient air passing over the bottom wall 162 and the side walls 164a-164d of the tank 160.

Figure 4:
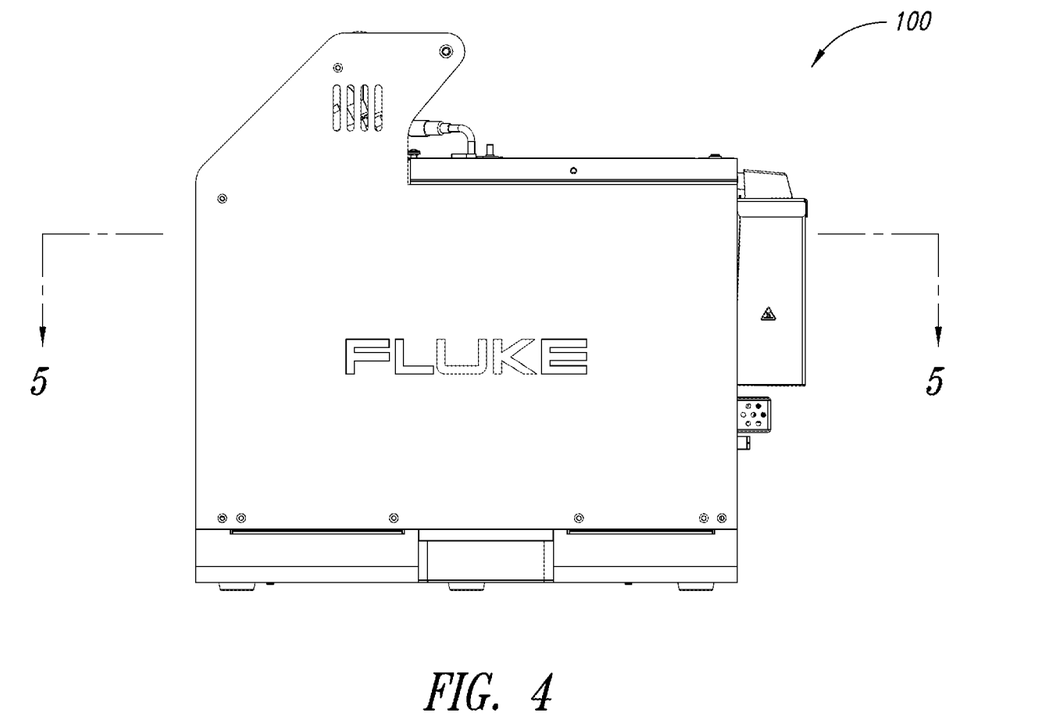
FIG. 4 is a side view of a calibration device, according to one or more embodiments of the present disclosure.
Figure 5:
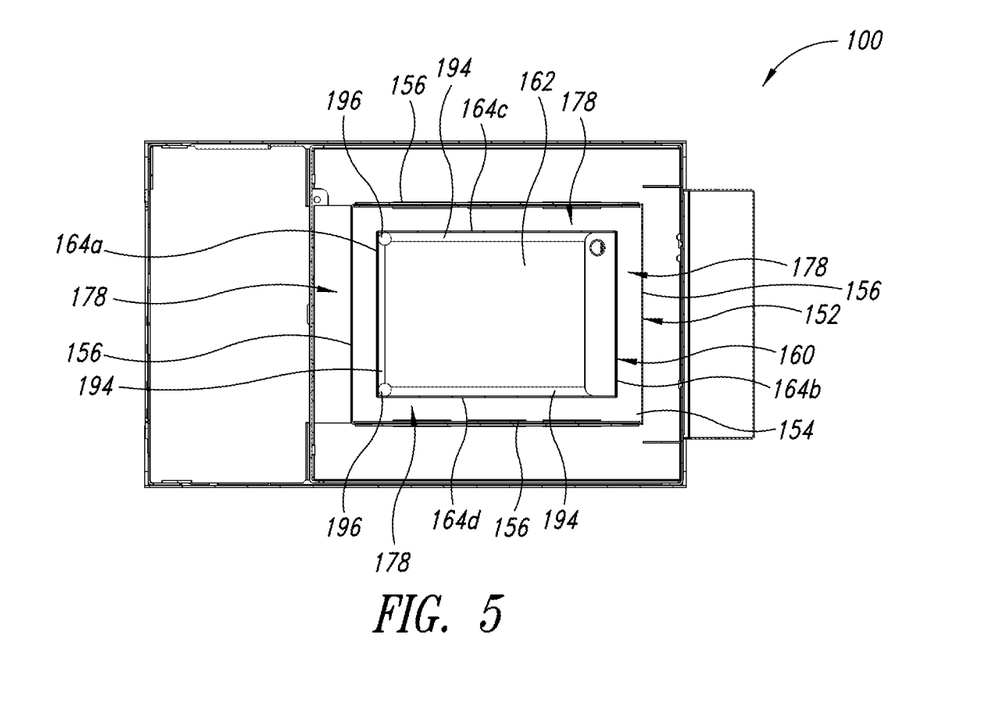
FIG. 5 is a sectional view of a calibration device, according to one or more embodiments of the present disclosure.

FIG. 4 is a side plan view of the calibration device 100, according to one or more embodiments of the present disclosure. FIG. 5 is a sectional view of the calibration device 100 taken along the line 5-5 in FIG. 4, according to one or more embodiments of the present disclosure. Components of the calibration device 100 that are not necessary to explain aspects of the calibration device 100 discussed below are not shown in FIG. 5 to simplify the discussion that follows.

As shown in FIG. 5, the conduit 178 extends around the side walls 164a-164d of the tank 160, between the side walls 164a-164d of the tank 160 and the side walls 156 of the chamber 152. Accordingly, air flowing in the conduit 178 contacts a large surface area on the exterior surface of the tank 160, which enables the air to rapidly remove heat from the fluid within the tank 160.

In one or more embodiments, the tank 160 includes four rounded surfaces 194, three of which are shown in FIG. 5. More particularly, the bottom wall 162 has a rectangular shape. Each rounded surface 194 is formed between one of the four sides of the bottom wall 162 and the bottom of one of the side walls 164a-164d. In one or more embodiments, each rounded surface 194 has the shape of an elliptical or circular arc with a radius of 5 millimeters. In one or more embodiments, each rounded surface 194 has the shape of an elliptical or circular arc with a radius of 10 millimeters. Each rounded surface 194 can have a radius of a different length or of a different round shape without departing from the scope of the present disclosure. The rounded surfaces 194 prevent the fluid in the tank 160 from becoming trapped in the lower portions of the tank 160 where the side walls 164a-164d meet the bottom wall 162, as the fluid is being circulated by the propeller 172.

In one or more embodiments, the tank 160 includes four rounded corners 196, two of which are shown in FIG. 5. Each rounded corner 196 is formed at one of the four lower corners of the tank 160 where the bottom wall 162 and two adjacent side walls 164a-164d meet. In one or more embodiments, each rounded corner 196 has the shape of a portion of an ellipsoid or spherical surface with a radius of 5 millimeters. In one or more embodiments, each rounded corner 196 has the shape of a portion of an ellipsoid or spherical surface with a radius of 10 millimeters. Each rounded corner 196 can have a radius of a different length or of a different round shape without departing from the scope of the present disclosure. The rounded corners 196 prevent the fluid in the tank 160 from becoming trapped in the lower corners of the tank 160, where pairs of adjacent side walls 164a-164d meet the bottom wall 162, as the fluid is being circulated by the propeller 172. The rounded surfaces 194 and the rounded corners 196 enable the fluid to circulate within the tank 160 more efficiently than in conventional tanks that do not include such rounded features.

Figure 6:
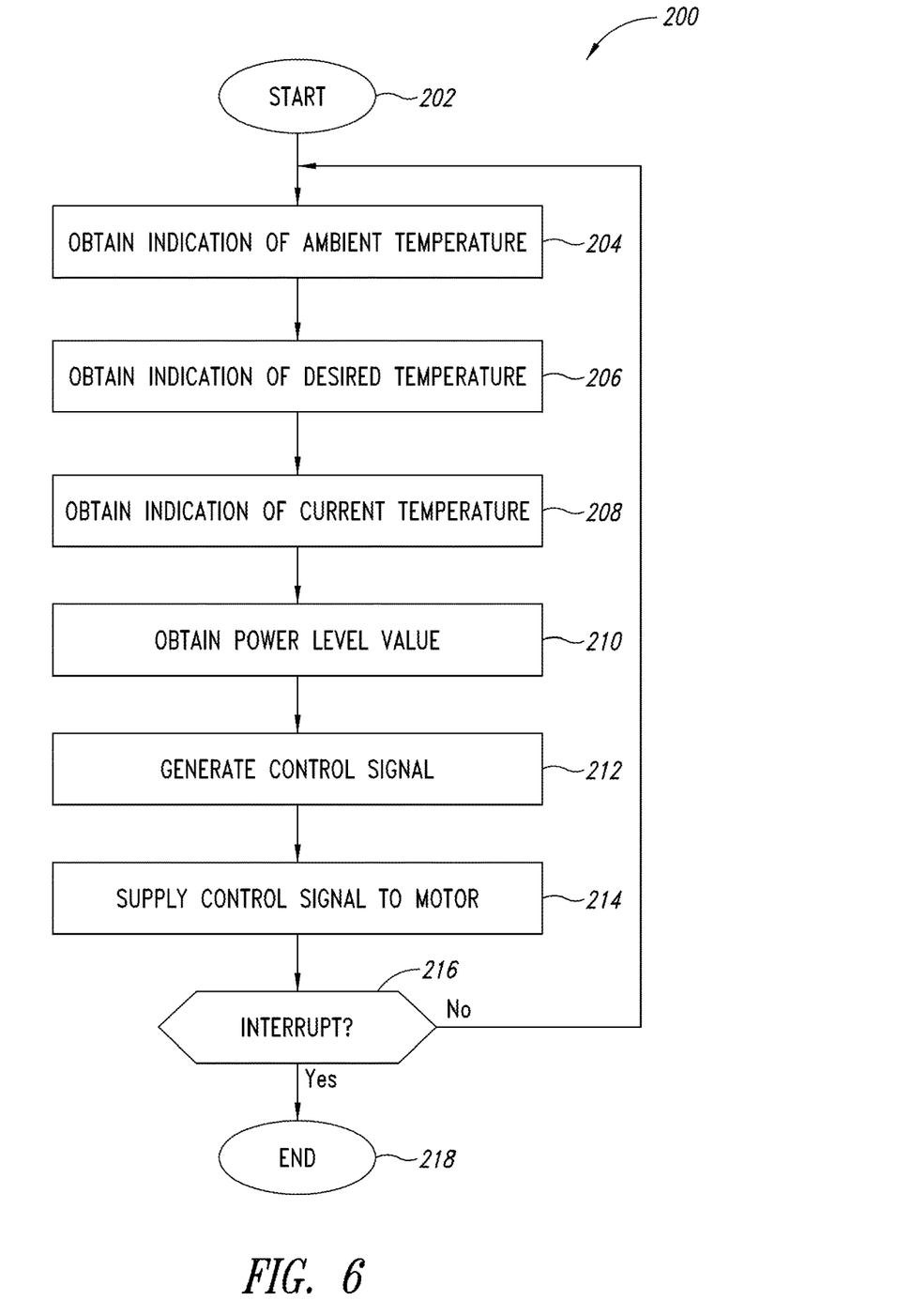
FIG. 6 is a flowchart of a method, according to one or more embodiments of the present disclosure.

FIG. 6 is a flowchart of a method 200 of operating the calibration device 100, according to one or more embodiments of the present disclosure. The method begins at 202, for example, when an operator places the calibration device 100 in a mode for configuring parameters for performing calibration testing. The method 200 then proceeds to 204.

At 204, an indication of an ambient temperature is obtained. The ambient temperature is a temperature in the environment in which the calibration device 100 is located. In one or more embodiments, the microprocessor 102 receives the indication of the ambient temperature in response to an operator actuating one or more buttons of a keypad of the control panel 140 to enter the ambient temperature, or in response to the operator selecting the ambient temperature within a list of predetermined temperatures included in a menu. In one or more embodiments, the microprocessor 102 receives the indication of the ambient temperature from one of the temperature sensors 124. The method 200 then proceeds to 206.

At 206, an indication of a desired temperature is obtained. The desired temperature is a temperature at which a fluid in the tank 160 is to be heated and maintained. For example, the microprocessor 102 receives the indication of the desired temperature in response to an operator actuating one or more buttons of a keypad of the control panel 140 to enter the desired temperature, or in response to the operator selecting the desired temperature within a list of predetermined temperatures included in a menu. The method 200 then proceeds to 208.

At 208, an indication of a current temperature is obtained. The current temperature is a current temperature of the fluid in the tank 160. For example, the microprocessor 102 receives the indication of the current temperature from one or more of the temperature sensors 124. The method 200 then proceeds to 210.

At 210, a power level value is obtained. The power level value is a parameter associated with the control signal 118 that is provided to the fan motor 114. In one or more embodiments, the microprocessor 102 executes instructions stored in the memory 108 to obtain the power level value based on the indications of the desired temperature and the current temperature obtained at 206 and 208, respectively. For example, the memory 108 stores a table or other suitable data structure that associates a plurality of values of differences between the current temperature and the desired temperature of the fluid in the tank 160 with a plurality of corresponding power level values. The microprocessor 102 calculates the difference between the current temperature and the desired temperature of the fluid in the tank 160 based on the indications obtained at 206 and 208, respectively. The microprocessor 102 then obtains a power level value that is associated with a value of the difference between the current temperature and the desired temperature of the fluid in the tank 160 that most closely matches the calculated difference between the current temperature and the desired temperature of the fluid in the tank 160.

In one or more embodiments, the microprocessor 102 takes the ambient temperature of the environment in which the calibration device 100 is located into consideration when obtaining the power level value at 210. For example, the memory 108 stores a plurality of tables or other suitable data structures that associate a plurality of values of differences between the current temperature and the desired temperature of the fluid in the tank 160 with a plurality of corresponding power level values, wherein each table is associated with a different value of a difference between the temperature of the fluid in the tank 160 and the ambient temperature. In one or more embodiments, the values included in such tables are obtained through experimentation in view of the following equation.

$$Q = K \times A \times \Delta T \qquad \text{(Equation 1)}$$

In equation 1, the parameter Q is the cooling energy required to establish a desired temperature balance and thermal response using the calibration device 100. The parameter K is the thermal conductivity to the ambient environment in which the calibration device 100 is located relative to heat loss or cooling. The parameter $\Delta T$ is the temperature difference between the fluid in the tank 160 and the ambient environment. The parameter A is the area of heat exchange. The calibration device 100 is constructed such that K is $\Delta T$ variable so that there is sufficient isolation to the ambient environment for good control and for safety while providing a higher degree of heat loss when needed.

In one or more embodiments, the microprocessor 102 executes instructions stored in the memory 108 to obtain the power level value based on the indications of the ambient temperature, the desired temperature, and the current temperature obtained at 204, 206, and 208, respectively. More specifically, the microprocessor 102 calculates the difference between the current temperature of the fluid in the tank 160 and the ambient temperature based on the indications of the ambient temperature and the current temperature obtained at 204 and 206, respectively. The microprocessor 102 also calculates the difference between the current temperature of the fluid in the tank 160 and the desired temperature of the fluid in the tank 160 based on the indications obtained at 206 and 208, respectively. In addition, the microprocessor 102 selects a table or data structure that is associated with a value of the difference between the current temperature of the fluid in the tank 160 and the ambient temperature that most closely matches the calculated difference between the current temperature of the fluid in the tank 160 and the ambient temperature. The microprocessor 102 then obtains, from the selected table or data structure, a power level value that is associated with a value of the difference between the current temperature and the desired temperature of the fluid in the tank 160 that most closely matches the calculated difference between the current temperature and the desired temperature of the fluid in the tank 160.

In one or more embodiments, the power level values included in the above-described tables or data structures are duty cycle values of the control signal 118 that is supplied to the fan motor 114. In one or more embodiments, the maximum duty cycle value included in such a table or data structure is less than 100%, for example, 75%. When the control signal 118 that is supplied to the fan motor 114 has a duty cycle that is higher than the maximum duty cycle value, portions of fluid near walls of the tank 160 may become cooled too quickly. As a result, the propeller 172 may not be able to stir the fluid in the tank 160 fast enough to ensure that the fluid has a uniform temperature throughout the volume of fluid, which is undesirable while calibration of thermal devices is being performed.

In one or more embodiments, the memory 108 stores tables or other suitable data structures that are similar those described above except that, instead of storing power level values, the tables or data structures store values of speeds of the fan motor 114. In one or more embodiments, after a speed of the fan motor 114 is obtained from one of those tables or data structures, the microprocessor 102 uses a predefined formula or table to convert the obtained speed into a power level value that causes the fan motor 114 to rotate at the obtained speed.

After the power level value is obtained at 210, the method 200 proceeds to 212. At 212, a control signal is generated. For example, the microprocessor 102 generates a control signal 116 having a duty cycle corresponding to the power level value obtained at 210, and supplies the control signal 116 to the fan motor driver circuit 112. The fan motor driver circuit 112 generates a corresponding control signal 118 based on the control signal 116, for example, by amplifying the control signal 116. The method 200 then proceeds to 214.

At 214, the control signal is supplied to a motor. For example, the fan motor driver circuit 112 supplies the control signal 118 to the fan motor 114. The method 200 then proceeds to 216.

At 216, a determination is made regarding whether an interrupt has been generated. For example, the microprocessor 102 checks the value of a predetermined variable or a voltage level of a predetermined terminal and determines whether the value of the variable or the voltage level of the terminal has a predetermined value. The interrupt may be generated when an operator manipulates one or more buttons on the control panel 140 to initiate a procedure for shutting down the calibration device 100, for example. If a determination is made at 216 that an interrupt has not been generated, the method 200 returns to 204, and the acts 204-216 are repeated. If a determination is made at 216 that an interrupt has been generated, the method 200 proceeds to 218, where the method 200 ends.

The calibration device 100 performing the method 200 provides an improvement over conventional calibration baths. For example, in one experiment, a fluid was heated to 250° C. using a conventional calibration bath and also using a calibration device according to the present disclosure, and the amount of time required to cool the fluid to 35° C. was measured for each. The conventional calibration bath took over 9 hours to cool the fluid to 35° C.; however, the calibration device according to the present disclosure took only 45 minutes. Thus, the calibration device 100 according to the present disclosure can improve calibration time efficiency by reducing the amount of time an operator must wait before being able to safely move the calibration device 100 after calibration of thermal devices has been performed, for example.

In addition, the calibration device 100 performing the method 200 can extend the useful life of fluids used in the calibration device 100 because the fluids do not remain heated above their oxidation temperatures for long periods of time after calibration of thermal devices has been performed using those fluids. Because fluids used in the calibration device 100 can be expensive, extending the useful life of such fluids can result in significant cost savings over time. In addition, the calibration device 100 performing the method 200 can operate at just 5° C. above ambient, for example, which cannot be accomplished with conventional calibration baths.

The various embodiments described above can be combined to provide further embodiments. Although the example embodiments have been described in the context of a high-temperature calibration bath, the present disclosure is applicable to low-temperature calibration baths. For example, the heater circuit 122 can be replaced with a circuit that cools a fluid disposed within the tank 160, and the microprocessor 102 can control the fan 188 to move ambient air into the conduit 178 to add heat to the fluid disposed within the tank 160. In addition, the fan 188 may be replaced by a pump having a motor that is coupled to an impeller, one or more pistons, one or more plungers, or one or more diaphragms. Additionally, the microprocessor 102 may control a speed at which the pump motor rotates based input received from one or more of the temperature sensors 124, in a manner that is similar to the above-described manner in which the microprocessor 102 controls a speed at which the fan motor 114 rotates.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A calibration device, comprising:
 a tank which, in operation, contains a temperature-controlled fluid, the tank including a bottom wall and a plurality of side walls,
 wherein the side walls include a first side wall having a first surface that forms a first obtuse angle with a surface of the bottom wall, and a second side wall having a first surface that forms a second obtuse angle with the surface of the bottom wall,
 wherein the first side wall is opposite the second side wall, and
 wherein a distance from the surface of the bottom wall to an end of the first surface of the first side wall farthest from the surface of the bottom wall is greater than a distance from the surface of the bottom wall to an end of the first surface of the second side wall farthest from the surface of the bottom wall;
 a motor;
 a fluid propulsion device coupled to the motor, the fluid propulsion device being disposed inside the tank directly above the first surface of the first side wall; and
 a heater circuit which, in operation, generates heat within the tank,
 wherein, while the fluid propulsion device rotates in a predetermined direction, the fluid propulsion device is arranged to move the temperature-controlled fluid that is disposed in the tank and heated by the heater circuit toward the first surface of the first side wall such that some of the fluid heated by the heater circuit deflects off of the first surface of the first side wall and some of the fluid heated by the heater circuit travels across a lower portion of the tank and deflects off of the first surface of the second side wall.

2. The device of claim 1, wherein the first side wall includes a second surface that extends from the first surface of the first side wall and forms a third obtuse angle with the first surface of the first side wall.

3. The device of claim 2, wherein the second side wall includes a second surface that extends from the first surface of the second side wall and forms a fourth obtuse angle with the first surface of the second side wall.

4. The device of claim 3, wherein the second surface of the second side wall is longer than the second surface of the first side wall.

5. The device of claim 1, wherein:
 the side walls include the first side wall, the second side wall, a third side wall, and a fourth side wall;

a first rounded corner is disposed within the tank where the first side wall, the third side wall, and the bottom wall meet;
a second rounded corner is disposed within the tank where the first side wall, the fourth side wall, and the bottom wall meet;
a third rounded corner is disposed within the tank where the second side wall, the third side wall, and the bottom wall meet; and
a fourth rounded corner is disposed within the tank where the second side wall, the fourth side wall, and the bottom wall meet.

6. The device of claim 5, wherein:
a first rounded surface is disposed within the tank where the first side wall and the bottom wall meet;
a second rounded surface is disposed within the tank where the second side wall and the bottom wall meet;
a third rounded surface is disposed within the tank where the third side wall and the bottom wall meet; and
a fourth rounded surface is disposed within the tank where the fourth side wall and the bottom wall meet.

7. The device of claim 1, further comprising:
one or more temperature sensors; and
a controller coupled to the motor and the one or more temperature sensors, the controller, in operation, causing the motor to rotate at a plurality of speeds based on input from the one or more temperature sensors.

8. The device of claim 1, wherein each of the first surface of the first side wall, the first surface of the second side wall, and the surface of the bottom wall is flat.

9. A calibration device, comprising:
a tank which, in operation, contains a temperature-controlled fluid, the tank including a bottom wall and a plurality of side walls, the side walls including a first side wall, a second side wall, a third side wall, and a fourth side wall,
wherein a first surface of the first side wall forms a first obtuse angle with a surface of the bottom wall, and a first surface of the second side wall forms a second obtuse angle with the surface of the bottom wall,
wherein the first side wall is opposite the second side wall, and
wherein a distance from the surface of the bottom wall to an end of the first surface of the first side wall farthest from the surface of the bottom wall is greater than a distance from the surface of the bottom wall to an end of the first surface of the second side wall farthest from the surface of the bottom wall;
a motor;
a fluid propulsion device disposed inside the tank and coupled to the motor; and
a heater circuit which, in operation, generates heat within the tank,
wherein the fluid propulsion device is disposed directly above a surface of the first side wall,
wherein a first rounded corner is disposed within the tank where the first side wall, the third side wall, and the bottom wall meet,
wherein a second rounded corner is disposed within the tank where the first side wall, the fourth side wall, and the bottom wall meet,
wherein a third rounded corner is disposed within the tank where the second side wall, the third side wall, and the bottom wall meet,
wherein a fourth rounded corner is disposed within the tank where the second side wall, the fourth side wall, and the bottom wall meet,
wherein a first rounded surface is disposed within the tank where the first side wall and the bottom wall meet,
wherein a second rounded surface is disposed within the tank where the second side wall and the bottom wall meet,
wherein a third rounded surface is disposed within the tank where the third side wall and the bottom wall meet,
wherein a fourth rounded surface is disposed within the tank where the fourth side wall and the bottom wall meet, and
wherein, while the fluid propulsion device rotates in a predetermined direction, the fluid propulsion device is arranged to move the temperature-controlled fluid that is disposed in the tank and heated by the heater circuit toward the first surface of the first side wall such that some of the fluid heated by the heater circuit deflects off of the first surface of the first side wall and some of the fluid heated by the heater circuit travels across a lower portion of the tank and deflects off of the first surface of the second side wall.

10. The device of claim 9, wherein the first side wall includes a second surface that extends from the first surface of the first side wall and forms a third obtuse angle with the first surface of the first side wall, and the second side wall includes a second surface that extends from the first surface of the second side wall and forms a fourth obtuse angle with the first surface of the second side wall.

11. The device of claim 9, further comprising:
one or more temperature sensors; and
a controller coupled to the motor and the one or more temperature sensors, the controller, in operation, causing the motor to rotate at a plurality of speeds based on input from the one or more temperature sensors.

12. The device of claim 9, wherein each of the first surface of the first side wall, the first surface of the second side wall, and the surface of the bottom wall is flat.

* * * * *